July 28, 1925.
J. F. MATHEWS
LUGGAGE CARRIER
Filed Dec. 5, 1923
1,547,671
2 Sheets-Sheet 1
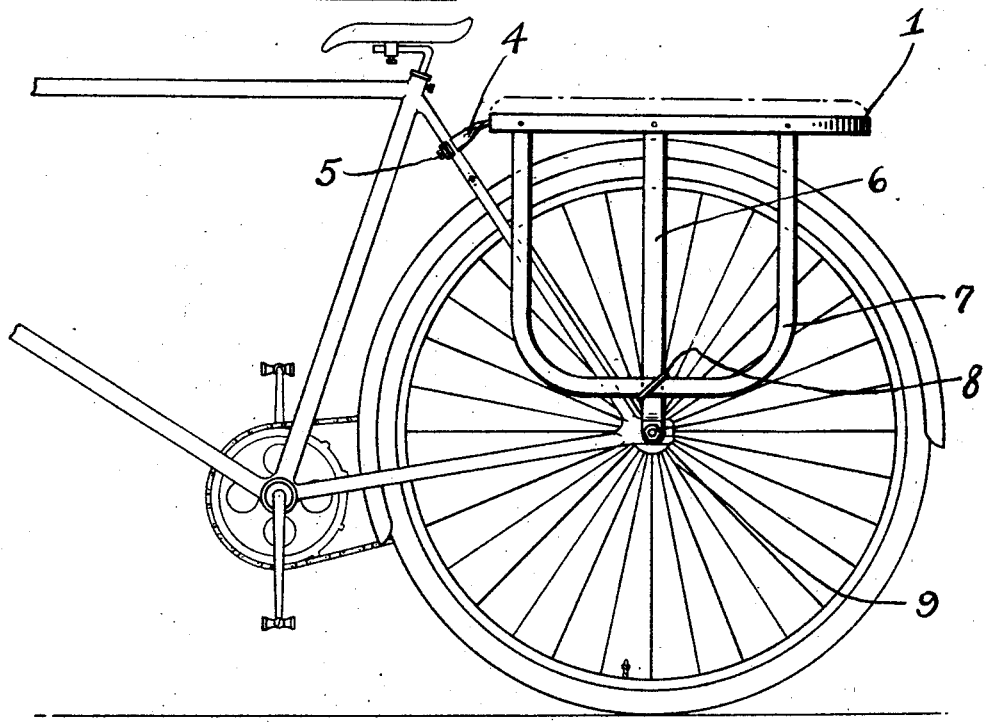
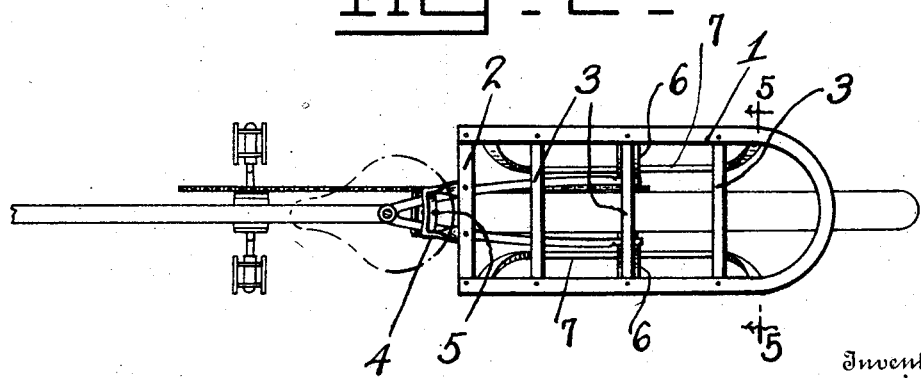
Inventor
John F. Mathews
By L. B. James
Attorney July 28, 1925.

J. F. MATHEWS 1,547,671

LUGGAGE CARRIER

Filed Dec. 5, 1923

Inventor
John F. Mathews
By L. B. James
Attorney

Patented July 28, 1925.

1,547,671

UNITED STATES PATENT OFFICE.

JOHN F. MATHEWS, OF GLENDALE, CALIFORNIA.

LUGGAGE CARRIER.

Application filed December 5, 1923. Serial No. 678,595.

*To all whom it may concern:*

Be it known that I, JOHN F. MATHEWS, a citizen of the United States, residing at Glendale, in the county of Los Angeles and State of California, have invented new and useful Improvements in Luggage Carriers, of which the following is a specification.

This invention relates to a luggage carrier or rack for bicycles or motor cycles for carrying packages or a person, the general object of the invention being to make the body part of great strength and of light weight by forming it of angle iron.

Another object of the invention is to provide movable members for connecting the body of the rack to the frame of the bicycle.

A still further object of this invention resides in the provision of a luggage carrier, for a bicycle or motorcycle, of such construction that a paper sack or other suitable cover can be arranged thereon so its overhanging sides will remain out of contact with the spokes of the adjacent wheel, and thus form a convenient, removable mudguard.

This invention also consists in certain other features of construction and in the combination and arrangement of the several parts, to be hereinafter fully described, illustrated in the accompanying drawings wherein like characters denote like or corresponding parts throughout the several views, and in which:

Fig. 1 is a side view of a bicycle showing the invention in use.

Fig. 2 is a plan view of Fig. 1.

Figure 3:
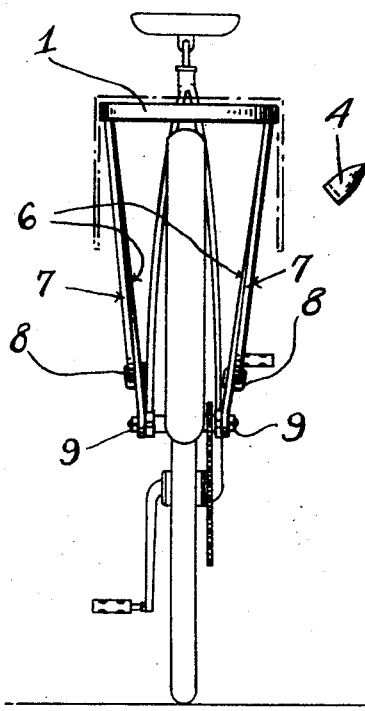
Fig. 3 is a rear view.
Figure 4:
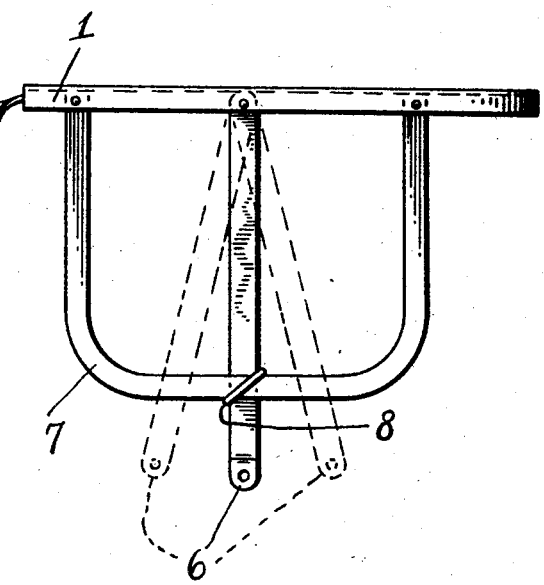
Fig. 4 is an enlarged side view of the device itself.
Figure 6:
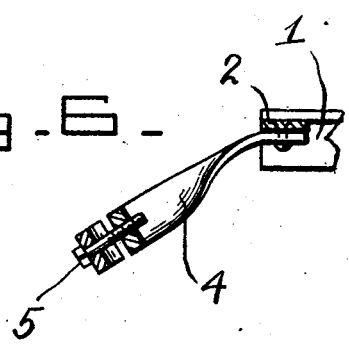
Figs. 5 and 6 are detail views.
Figure 5:
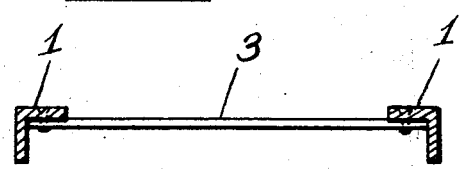

In these views 1 indicates a substantially U-shaped frame which is formed of angle iron and which has its end pieces connected together by a metal strap 2. Cross straps 3, preferably of flat iron, connect the side pieces of the frame together. The metal strap 2 carries a clamp 4 for engaging the seat bar of the bicycle and this member is secured to the bar by the bolt 5. Bars 6 are pivotally connected to the center of the frame, one at each side thereof, and curved side pieces 7 forming guide members have their ends connected with the frame and their bights connected with the bars 6 by guide rings 8 so that the bars 6 are movable. These bars are adapted to be connected with the rear axle of the bicycle or motorcycle by the connections 9.

From the foregoing it will be seen that I have provided a rack of great strength and of light weight and one which is adjustably connected with the bicylcle. By placing a pad on the device it may be used as a seat for a passenger. If the bicycle is not provided with a mud guard a cover or paper sack can be placed on the rack so that the device will act as a mud guard and, in the use of the latter, the bars 7 will prevent the overhanging portions of the sack from contacting with the spokes of the adjacent wheel.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A rack of the class described comprising a U-shaped frame, depending side bars pivotally connected to the sides of the frame, U-shaped guide pieces secured to the frame at points remote from the pivotal connections of the side bars and frame, guide rings loosely connecting the bases of the U-shaped guide pieces to the side bars, means securing the extremities of the side bars to the axle of a bicycle and a clamp removably securing the U-shaped frame to the frame of a bicycle.

In testimony whereof I affix my signature.

JOHN F. MATHEWS.